United States Patent [19]
Pearson

[11] Patent Number: 4,656,819
[45] Date of Patent: Apr. 14, 1987

[54] CHAIN SICKLE

[76] Inventor: Willard Pearson, Box 98, R.R. 1, Dawson, Minn. 56232

[21] Appl. No.: 774,241

[22] Filed: Sep. 9, 1985

[51] Int. Cl.⁴ ............................................. A01D 34/83
[52] U.S. Cl. ........................................ 56/291; 56/244
[58] Field of Search .................. 56/244, 245, 291, 290, 56/292; 30/274

[56] References Cited

U.S. PATENT DOCUMENTS

| | | |
|---|---|---|
| 391,142 | 10/1888 | Gumz . |
| 395,493 | 1/1889 | Hanson . |
| 468,859 | 2/1892 | Wright . |
| 589,611 | 9/1897 | Northern . |
| 664,670 | 12/1900 | Oldham ................................ 56/292 |
| 677,095 | 6/1901 | Nagel . |
| 859,600 | 7/1907 | Ellis ...................................... 56/245 |
| 892,402 | 7/1908 | Chesrown ............................ 56/292 |
| 1,057,948 | 4/1913 | Doering ................................ 56/245 |
| 1,200,520 | 10/1916 | Platt . |
| 1,409,507 | 3/1922 | Wilson . |
| 3,006,126 | 10/1901 | Viverette ............................. 56/244 |
| 3,006,129 | 10/1961 | Sanre .................................... 56/292 |
| 3,029,584 | 4/1962 | Johnson ............................... 56/291 |
| 3,561,202 | 2/1971 | Tupper ................................. 56/245 |
| 3,681,901 | 8/1972 | Quick et al. ......................... 56/13.6 |
| 4,070,810 | 1/1978 | Brakke ................................. 56/291 |

*Primary Examiner*—Paul J. Hirsch
*Attorney, Agent, or Firm*—Merchant, Gould, Smith, Edell, Welter & Schmidt

[57] ABSTRACT

A cutting and mowing apparatus (1) comprising a continuous chain (11) of cutting blades (12). The chain is confined within rail assembly (6) by means of alternating chain members (14) and links (13). The alternating chain links (14) and (15) are compatibly shaped so that both chain members and link (13) may be efficiently formed from a single flat metal plate. The chain sickle (1) is powered from the hydraulic system of the parent device, such as a tractor (3).

7 Claims, 6 Drawing Figures

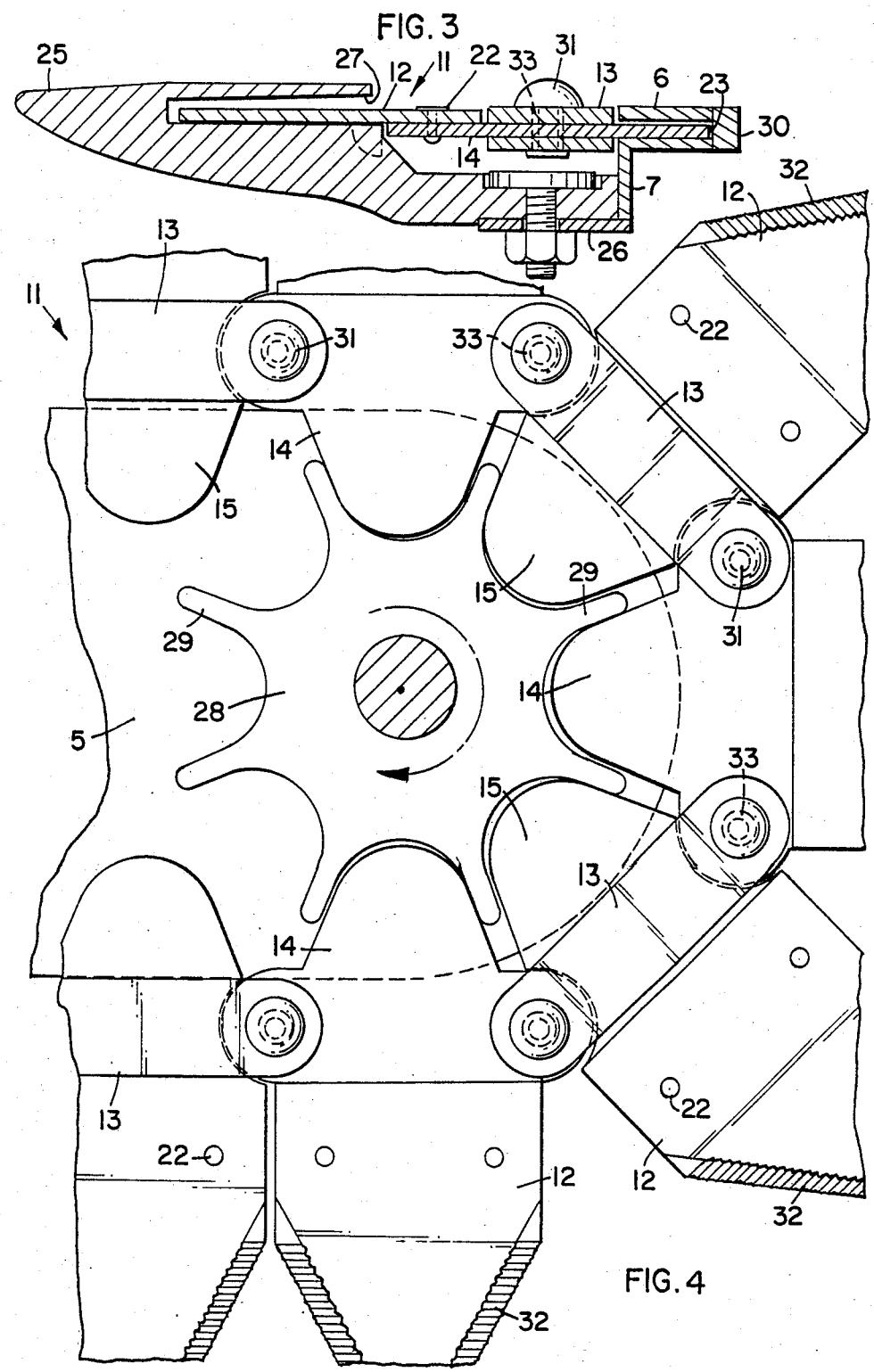

CHAIN SICKLE

BACKGROUND OF THE INVENTION

1. Field of the Invention

This invention relates generally to a cutting and mowing apparatus. In particular, this invention relates to an apparatus for translating a continuous chain of cutting blades around the perimeter of an elongated frame member. The apparatus may be conveniently powered by the hydraulic system of an existing tractor or combine, or by an independent electric or gasoline motor.

2. Description of Related Technology

Conventional cutting and mowing apparatus typically utilize a number of reciprocating knife edged blades in conjunction with periodically spaced center guards. The disadvantage of reciprocating blade technology is well-known. For instance, this type of cutter causes plants being harvested to be bent forwardly and sidewardly during blade reversals, thereby compressing the plants between the center guards prior to the cutting action. Even if damage to the plants being cut is not a consideration, the use of a reciprocating cutting action creates considerable vibration as the blades reverse direction throughout the cutting cycle. The reciprocating action of the blades tends to create more noise, and is slowed by the fact that the sickle or blade must stop at each end of the cutting stroke in order to reverse direction.

Numerous devices have been utilized in an effort to avoid, or at least minimize, the disadvantages of a reciprocating cutting device. For example, U.S. Pat. No. 391,142, issued to Gumz, discloses a rotary cutting device. The use of sprocket wheels D and R permits a series of knife blades A to be continuously translated between center fingers F. In this particular system, the chain formed by knife blades A must be kept in continuous tension in order to prevent slippage between chain links H.

U.S. Pat. No. 395,493, issued to Hanson, discloses a cutting mechanism utilizing a continuous chain. In order to reduce the requirement for constant tension in the chain, a conventional chain is used to engage sprocket wheels, while cutting blades E' are periodically fastened to the chain. A requirement of this system is the preservation of a considerable space between successive blades in order to accomplish the desired rotation and engagement functions as the blades pass over the sprocket wheel.

U.S. Pat. No. 468,859, issued to Wright, discloses a rotary sickle. The blades D2 are attached to an existing chain which travels along a path D1, thereby preventing any twisting movement of the chain itself or the blades that are attached to it. Again, a considerable space must be left between succeeding blades in order to allow for proper travel of the chain along the sprocket wheels.

U.S. Pat. No. 589,611, issued to Northern, discloses a mowing and reaping machine. Succeeding blades 25 are attached my means of clasp 30, thereby forming a continuous chain made up of alternating links of clasps 30 and blades 25. Successive blades 25 are thereby separated by the relatively short distance defined by the length of clasp 30. The clasp and the rear extension of the blade 25 are retained in a channel 13 in order to give the entire chain additional stability as it passes between fingers 12.

U.S. Pat. No. 677,095, issued to Nagel, discloses a mowing machine. The successive cutting blades 48 are connected by means of links 58. The blades 48 are actually held in place by means of semi-circular notches 61, which abut link bolts 49, thereby allowing the cutting blades to be removed from the chain without means of rivets, bolts or screws.

U.S. Pat. No. 1,200,520, issued to Platt, discloses an endless conveyor belt type of sickle. Platt discloses a separate chain 20 upon which are mounted blades. The sprocket wheel 29 engages a recessed space within the chain to advance the blades along their cutting path.

U.S. Pat. No. 1,409,507, issued to Wilson, discloses a continuous chain cutting device. Blades 16 are attached to a conventional sprocket chain 15, the entire assembly being supported in a horizontal position by means of bar 17.

U.S. Pat. No. 3,029,584, issued to Johnson, discloses an endless cutting assembly. A chain is formed by alternating links 38 with blades 39, the links being engaged by small protrusions 33 on a conventional sprocket wheel 29.

U.S. Pat. No. 3,681,901, issued to Quick et al., discloses a cutting knife assembly which may be attached to a combine. This assembly combines two rotary chains 24 and 26 traveling in opposite directions. The cutting knife assembly causes the bottom of stems of plants being cut to be displaced in the same direction as the knife travel so that after severance, the stem is inclined toward the center of the header or in the same direction as the auger feed.

U.S. Pat. No. 4,070,810, issued to Brakke, discloses a cutting apparatus. The cutting assembly consists of an endless chain carrying a plurality of cutting knives. The chain is driven by a hydraulic motor connected to a hydraulic fluid pressure system, thereby permitting the operator to control the speed of the chain as well as the direction of movement of the chain.

Each of the devices of the prior art, while sometimes satisfactory for their intended purposes, leaves something to be desired in that they are relatively complex in design, costly, cumbersome to use, and somewhat inefficient. In particular, the method of attaching the blade to the endless chain and providing for a light weight, simple, and mechanically straight forward method of transporting the blade through thousands of revolutions without jamming or the need for critical adjustment is a problem only partially addressed by the prior art devices. None of the devices disclosed has been commercially exploited or produced in quantity for use by the public.

SUMMARY OF THE INVENTION

The subject invention overcomes some of the disadvantages of the prior art, including those mentioned above, in that it comprises a relatively simple chain sickle mowing device which may utilize the existing hydraulic system of a combine or tractor.

The subject invention comprises a continuous chain which causes blades, which are affixed to the chain, to continuously translate around an elongated frame member. The blades perform their cutting operation virtually throughout the entire length of travel along one side of the frame member, except during the brief period when the blades are contained within the housing at each end of the elongated frame member. The chain sickle according to the present invention may be constructed of readily available materials.

One novel aspect of the present invention resides in the unique shape of the chain components and their interaction with each other during rotation about the frame member so to provide a continuous, stable and interlocking chain. Basically, the chain sections are composed of small, planar segments, typically formed of metal, having alternating shapes, one shape providing for the mounting of cross links which hold adjacent pieces in place, each cross link requiring the use of a rivet or other shafted fastener at each end in order to retain the chain sections in place.

Cutting blades are attached to each of the flat metal plates, thus providing a continuous cutting surface without the creation of any gaps caused by the chain linking mechanism. One novel aspect of the present invention resides in the fact that the path traveled by the planar chain segments is confined between two substantially flat rails which prevent twisting of the chain while allowing free translational movement in the direction of blade travel. A hydraulic motor (or two motors when used on a combine) is attached at one end of the continuous chain (or both ends if needed) and mounted to the frame member, the hydraulic power being derived from a parent hydraulic system in a tractor or combine, or from a separate pump when necessary. Controls accessible to the operator will allow the speed of the chain sickle to be adjusted according to the material being cut and also permitting the reversal of the chain's direction of travel, a feature that is especially useful in clearing any temporary jams that may occur.

BRIEF DESCRIPTION OF THE DRAWING

FIG. 3 is a sectional view taken along lines 3—3 of FIG. 2 showing an elevational view of the present invention as shown in FIG. 1.

FIG. 4 is a plan view of one end of the chain sickle according to the present invention as depicted in FIG. 1 showing details of the sprocket wheel construction.

DETAILED DESCRIPTION OF THE PREFERRED EMBODIMENT

Figure 1:
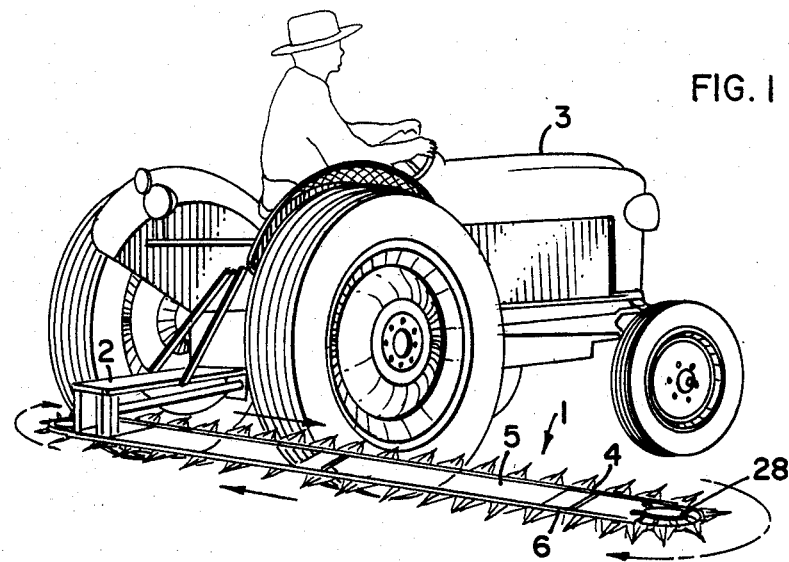
FIG. 1 is a pictorial view showing the chain sickle according to the present invention when in use with a tractor.

Referring to FIG. 1, there is shown generally at 1 a chain sickle according to the present invention which is attached by means of a suitable coupling 2 to a tractor 2. As shown by the direction of the arrows, the blades 4 are translated along one side of frame 5, around the ends, and then along the other side eventually returning to the starting point in a continuous motion. The direction of the arrows shown in FIG. 1 is illustrative only, since one feature of the present invention is the ability to reverse the direction of travel of the blades at will.

Figure 2:
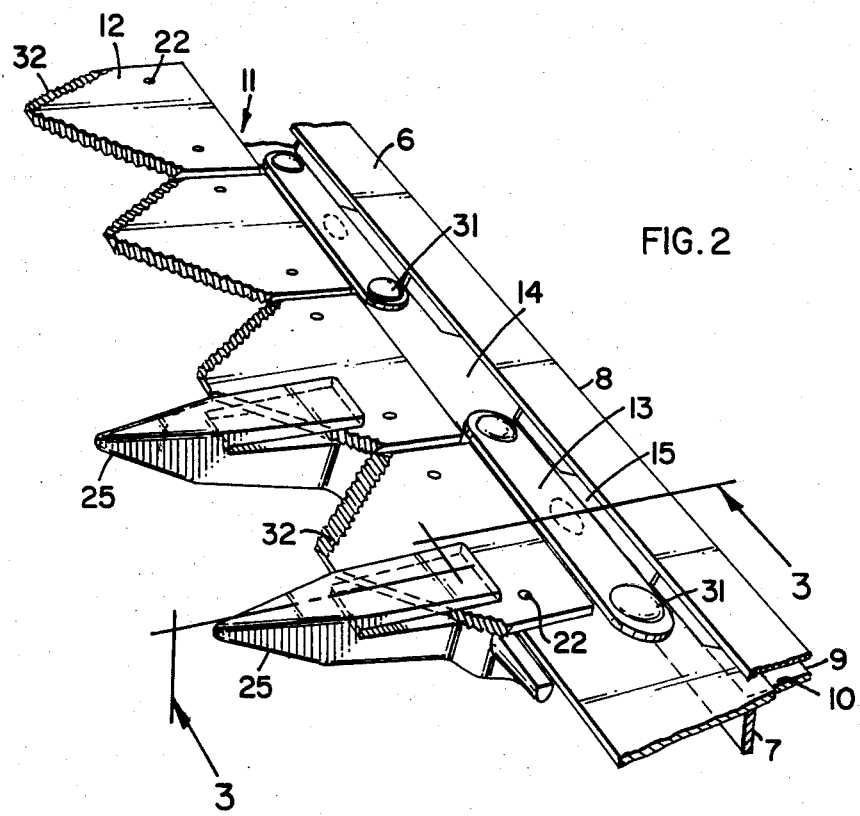
FIG. 2 is an isometric view of a portion of the chain sickle device according to FIG. 1.

Attached continuously along the perimeter of frame member 5 is rail 6, which is best viewed in FIG. 2. Attached to rail 6 along its entire length is angle bracket 7. Angle bracket 7 is separated from rail 6 by some suitable means, such as a rod 30 welded at periodic intervals along edge 8 of rail 6 and edge 9 of angle bracket 7, thus forming a channel 10 between rail 6 and angle bracket 7 within which the cutting assembly to be described may travel freely.

As best viewed in FIGS. 2 and 3, the cutting assembly is shown generally at 11. Cutting assembly 11 is comprised of blades 12, links 13, and alternating chain members 14 and 15.

Figure 5:
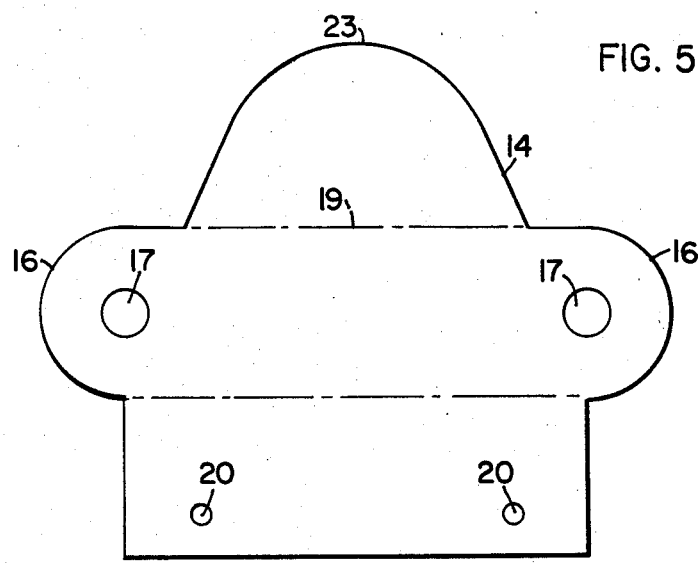
FIGS. 5 and 6 are top views of the adjacent chain members.
Figure 6:
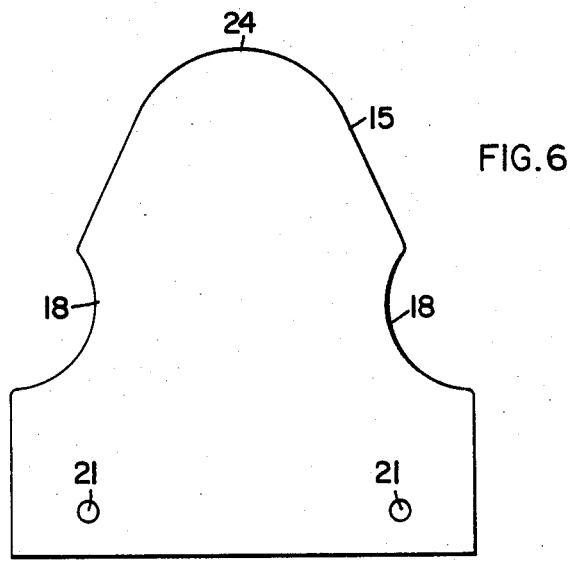

As best shown in FIGS. 5 and 6, chain members 14 and 15 are substantially polygonal in shape and quite similar to each other, except that chain member 14 has included in its midportion two rounded appendages 16 which contain a central orifice 17. Chain member 15, on the other hand, instead of possessing appendages 16, has corresponding concavities 18 which are compatibly shaped so as to interlock with appendages 16 when chain members 14 and 15 are adjacent to each other. Typically, both chain members 14 and 15 are constructed of thin metal plates which may be cut from a single piece of metal. The elongated appendages 16 of chain member 14, when being armed within a blank piece of metal, simultaneously form corresponding concavities 18 in the adjacent portion of the metal blank. The adjacent portion of metal can then be readily cut to serve as chain member 15.

In order to form a continuous chain comprised of alternating chain members 14 and 15, one must introduce a link member 13 which extends from appendage 16 of one chain member 14 across an adjacent chain member 15 and then to appendage 16 of the next chain member 14. Formed within each appendage 16 is an orifice 17. Thus, a fastener such as a rivet 31 may be used to connect link members 13 to chain members 14. A roller bearing or sleeve 33 may be placed around rivet 31, the sleeve 33 residing in central orifice 17. Two link members 13 must be placed across each shain member 15, one across each planar surface, thereby retaining chain member 15 and allowing appendages 16 to rotate freely within the concavities 18 as the chain assembly 11 is translated about the perimeter of frame member 5. Note that link member 13 may conveniently have exactly the same shape as defined in FIG. 5 by the perimeter of elongated appendages 16 and dashed line 19. Thus, one can readily recognize that manufacture of the chain is greatly simplified since all three elements which make up the chain, namely, chain members 14 and 15 and link 13 are all derived from basic shapes which are contained within chain member 14.

Once the chain has been constructed by the alternation of chain members 14 and 15 with the necessary interconnection by means of link members 13, the cutting blades 12 may be attached to the chain. Mounting holes 20 on chain member 14 and corresponding mounting holes 21 on chain member 15 permit the mounting of blades 12 on each chain member. Mounting is typically performed by means of rivets 22 or other shafted fasteners, such as bolts.

Chain element 14 has an inner edge 23. Chain element 15 has an inner edge 24 which is substantially identical to inner edge 23, both of which are confined within channel 10 between rail 6 and angle bracket 7. The cutting assembly 11 is prevented from leaving the confines of channel 10 by chain guards 25 which are anchored to angle bracket 7 by means of bracket 26. Chain guards 25 contain a slot 27 which permits the blade 12 to pass through the chain guard 25 during translational movement of the blade 12. In operation, the cutting assembly 11 moves in a direction substantially parallel to rail 6 in a continuous motion as illustrated in FIG. 1.

The cutting assembly 11 is propelled by any suitable motor. Typically such a motor would be hydraulic when connected to a tractor or combine, or could be an electric motor if the chain sickle according to the present invention was to be used in a more portable application.

In a preferred embodiment, the cutting assembly 11 is motivated by means of sprocket wheel 28. Sprocket wheel 28 contains a number of engaging fingers 29 which interlock with chain elements 14 and 15. As can be seen in FIG. 4, the direction of the arrow shows the rotational movement of the sprocket wheel 28. Direction of rotation may be reversed as desired, since blades 12 having a cutting surface 32 along substantially their entire exposed perimeter. The shapes and dimensions of the sprocket wheel 28 will vary according to the diameter of the sprocket wheel, with larger diameters requiring that the width of fingers 29 be increased so as to provide continuous contact with the chain elements during their engagement.

The construction and dimensions of frame member 5 are not critical. The width of frame member 5 must be sufficient only to accommodate the radius required for chain assembly 11 to negotiate its transit about sprocket wheel 28. Typically, the bottom of frame member 5 contains a skid element, which may consist of a smooth planar surface placed generally beneath the sprocket wheel 28. Any support member may be used which will permit frame member 5 to slide easily over the surface being mowed.

I claim:

1. A rotary cutting apparatus comprising:
   (a) a chain assembly, the chain assembly having an inner edge and an outer edge, the chain assembly comprising:
      (i) a first chain member, the first link member being substantially polygonal in shape with an elongated midsection, the elongated midsection having rounded ends; and
      (ii) a second chain member, the second link member being substantially polygonal in shape and substantially identical to the first chain member, the second chain member having a midsection in which are formed concavities, the concavities being compatibly shaped so as to mate with the rounded ends of the midsection of the first chain member;
   (b) a plurality of cutting blades, the cutting blades being rigidly affixed to the outer edge of the chain assembly;
   (c) a rail;
   (d) an angle bracket; the angle bracket being cooperatively mounted to the rail so as to form a channel such that the inner edge of the chain assembly is retained within the channel while permitting translational movement of the chain assembly in a direction substantially parallel to the rail;
   (e) a frame member, the fame member having a perimeter, a first end, and a second end, the frame member being formed as a relatively long and narrow planar surface to which the rail member is rigidly mounted such that the rail member extends around substantially the entire perimeter of the frame member, thereby permitting the cutting blades to extend outwardly from the frame member; and
   (f) means for motivating the chain assembly such that the chain assembly is caused to translate along the perimeter of the frame member, thereby permitting the cutting blades to perform a cutting operation.

2. A rotary cutting apparatus according to claim 1, wherein the chain assembly is comprised of alternating segments, one segment consisting of the first chain member and the succeeding segment consisting of the second chain member such that a continuous chain is formed of alternating first chain members and second chain members.

3. The apparatus of claim 2, wherein the rounded ends of the elongated middle section of the first chain member each contain an orifice passing through a plane defined by the first chain member such that a shafted fastener may be inserted through the orifice.

4. The apparatus of claim 3, wherein the chain assembly formed of alternating first chain members and second chain members is constructed such that two link members pass from one first chain member to a second first chain member, thereby crossing over and under a second chain member and retaining the second chain member in place, the link member being substantially identical in shape and size to the midsection of the first chain member.

5. The apparatus of claim 4, further comprising a first sprocket wheel and a second sprocket wheel, the first sprocket wheel being located at the first end of the frame member and the second sprocket wheel being located at the second end of the frame member, each sprocket wheel having finger like extensions, the extensions engaging the inner edge of the chain assembly so as to facilitate the translational movement of the chain assembly around the perimeter of the frame member.

6. The apparatus of claim 5, wherein a motor is mounted on the frame member so as to engage the first sprocket wheel and motivate the chain assembly.

7. The apparatus of claim 6, further comprising a skid, the skid being mounted on the frame member so as to facilitate movement of the frame member across a surface.

* * * * *